United States Patent
Koller et al.

(10) Patent No.: US 11,397,318 B2
(45) Date of Patent: Jul. 26, 2022

(54) LIGHTING ARRANGEMENT FOR A VEHICLE HAVING A MIRROR ARRANGEMENT CONFIGURED TO DIRECT EMITTED LIGHT AND SENSOR RADIATION FOR A SENSOR SYSTEM

(71) Applicant: Osram Beteiligungsverwaltung GmbH, Munich (DE)

(72) Inventors: Michael Koller, Hemau (DE); Michael Rosenauer, Regensburg (DE)

(73) Assignee: Osram Beteiligungsverwaltung GmbH, Munich (DE)

( * ) Notice: Subject to any disclaimer, the term of this patent is extended or adjusted under 35 U.S.C. 154(b) by 847 days.

(21) Appl. No.: 16/215,683

(22) Filed: Dec. 11, 2018

(65) Prior Publication Data

US 2019/0179138 A1 Jun. 13, 2019

(30) Foreign Application Priority Data

Dec. 13, 2017 (DE) .................... 10 2017 222 654.4

(51) Int. Cl.
*G02B 26/10* (2006.01)
*G01S 7/481* (2006.01)
(Continued)

(52) U.S. Cl.
CPC .......... *G02B 26/105* (2013.01); *B60Q 1/0023* (2013.01); *F21S 41/13* (2018.01); *F21S 41/16* (2018.01); *F21S 41/176* (2018.01); *F21S 41/18* (2018.01); *F21S 41/675* (2018.01); *G01S 7/4817* (2013.01); *B60Q 1/04* (2013.01)

(58) Field of Classification Search
CPC ... G02B 26/105; F21S 41/176; B60Q 1/0023; B60Q 2300/30; B60Q 2300/31; B60Q 2300/312; B60Q 2300/314; B60Q 2300/32; B60Q 2300/322; B60Q 2300/324; B60Q 2300/33; B60Q 2300/331; B60Q 2300/332; B60Q 2300/3321; B60Q 2300/333; B60Q 2300/335; B60Q 2300/336; B60Q 2300/337; B60Q 2300/338; F12S 41/18
See application file for complete search history.

(56) References Cited

U.S. PATENT DOCUMENTS 9,360,175 B2 6/2016 Eberhardt et al.
2013/0058114 A1 3/2013 Reiners
2016/0341673 A1 11/2016 Kuchler et al.

FOREIGN PATENT DOCUMENTS

DE 102010028949 A1 11/2011
DE 102012201307 A1 8/2013
(Continued)

OTHER PUBLICATIONS

German Search Report based on application No. 10 2017 222 654.4 (8 pages) dated Jul. 18, 2018 (for reference purpose only).

*Primary Examiner* — Robert J May
(74) *Attorney, Agent, or Firm* — Viering, Jentschura & Partner Mbb

(57) ABSTRACT

In various embodiments, an arrangement is provided. The arrangement includes a light source for a light system; an adaptive mirror arrangement connected downstream of the light source via which adaptive mirror arrangement light that is emittable by the light source is directable, and a radiation source for a sensor system for capturing an environment. The radiation from the radiation source for the sensor system is directable via the adaptive mirror arrangement.

20 Claims, 5 Drawing Sheets

(51) Int. Cl.
*B60Q 1/00* (2006.01)
*F21S 41/675* (2018.01)
*F21S 41/16* (2018.01)
*F21S 41/14* (2018.01)
*F21S 41/13* (2018.01)
*F21S 41/176* (2018.01)
*B60Q 1/04* (2006.01)

(56) References Cited

FOREIGN PATENT DOCUMENTS

| | | |
|---|---|---|
| DE | 102015204817 A1 | 9/2016 |
| DE | 102015205510 A1 | 9/2016 |
| DE | 102015209340 A1 | 11/2016 |
| DE | 102015213389 A1 | 1/2017 |
| DE | 102015221049 A1 | 5/2017 |
| DE | 102015226636 A1 | 6/2017 |
| DE | 102016207761 A1 | 11/2017 |
| DE | 102016207780 A1 | 11/2017 |

LIGHTING ARRANGEMENT FOR A VEHICLE HAVING A MIRROR ARRANGEMENT CONFIGURED TO DIRECT EMITTED LIGHT AND SENSOR RADIATION FOR A SENSOR SYSTEM

CROSS-REFERENCE TO RELATED APPLICATION

This application claims priority to German Patent Application Serial No. 10 2017 222 654.4, which was filed Dec. 13, 2017, and is incorporated herein by reference in its entirety.

TECHNICAL FIELD

Various embodiments relate generally to an arrangement. Various embodiments furthermore relate to a method and a vehicle with such an arrangement.

BACKGROUND

A laser activated remote phosphor (LARP) system, using LARP technology, is known as a light source for a light system. In this technology, a conversion element that is arranged at a distance from a radiation source and has, or consists of, a phosphor is irradiated by excitation radiation, in particular an excitation beam or pump beam or pump laser beam, in particular by the excitation beam of a laser diode. The excitation radiation is at least partly absorbed by the phosphor and at least partly converted into conversion radiation or into conversion light, the wavelengths of which and hence the spectral properties and/or color of which are determined by the conversion properties of the phosphor. In the case of down conversion, the excitation radiation of the radiation source is converted by the irradiated phosphor into conversion radiation having longer wavelengths than the excitation radiation. By way of example, this allows the conversion element to convert blue excitation radiation, in particular blue laser light, into red and/or green and/or yellow conversion radiation. In the case of a partial conversion, white used light is produced, for example, from a superposition of non-converted blue excitation light and yellow conversion light, said white used light for example being able to be used in a vehicle headlamp.

It is additionally known to provide one or more microelectromechanical systems (MEMS) or a digital light processing system (DLP system), which are for example connected downstream of the above-described LARP light source and, together with the light source, form a light system, for setting a light that is emitted by a vehicle headlamp. Both systems use one or more mirrors or micromirrors for light deflection.

Furthermore known are sensor systems for capturing the environment or for distance and speed measurement of objects, e.g., a light detection and ranging (LiDAR) system. LiDAR makes it possible to quickly capture the environment and the speed and movement direction of individual objects. LiDAR systems are used in the automotive sector for example in autonomously driving prototypes or for measuring map applications. Outside the automotive sector, LiDAR systems are used for example in astronomy, surveying or when ascertaining lengths or distances in spaces. In LiDAR systems, high-resolution sensor systems likewise use mirrors or micromirrors for directing an emitted laser beam.

SUMMARY

In various embodiments, an arrangement is provided. The arrangement includes a light source for a light system; an adaptive mirror arrangement connected downstream of the light source via which adaptive mirror arrangement light that is emittable by the light source is directable, and a radiation source for a sensor system for capturing an environment. The radiation from the radiation source for the sensor system is directable via the adaptive mirror arrangement.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
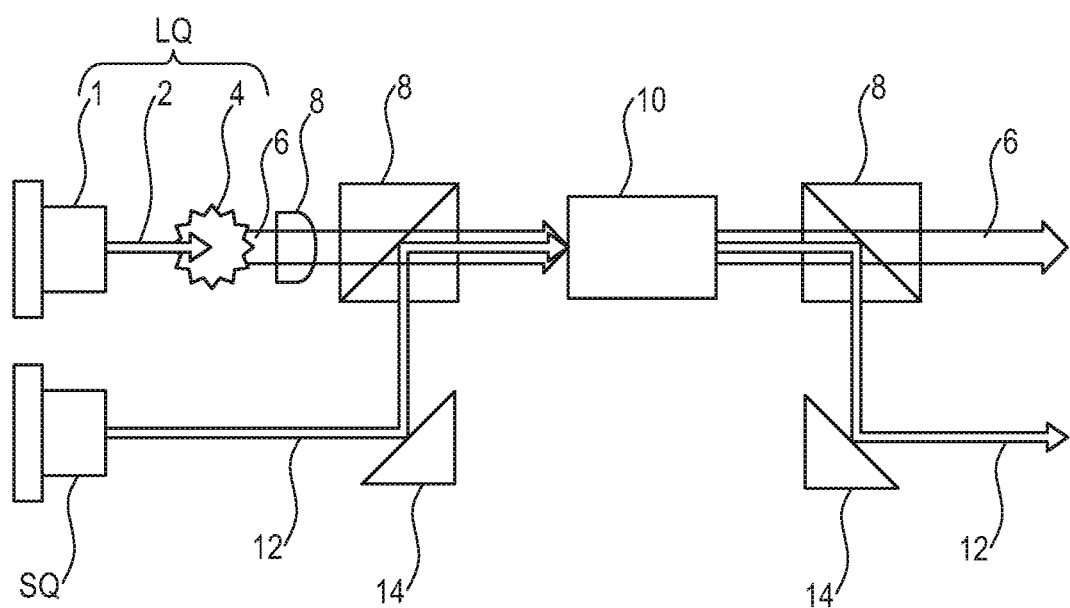
FIG. 1 shows a schematic view of an arrangement according to an embodiment.

The following detailed description refers to the accompanying drawings that show, by way of illustration, specific details and embodiments in which the invention may be practiced.

Various embodiments provide an arrangement for a light and a sensor system with which installation space, weight and costs can be reduced compared to a conventional arrangement. Furthermore, various embodiments provide a method for applying a light and sensor system having such an arrangement. Additionally various embodiments provide a vehicle having such an arrangement.

Provided according to various embodiments is an arrangement having a light source for a light system, wherein connected downstream of the light source is an adaptive mirror arrangement via which light that is emittable by the light source is able to be directed and/or modulated, and wherein a radiation source for a sensor system for capturing the environment is provided. The arrangement according to various embodiments is characterized in that the radiation from the radiation source for the sensor system is able to be directed via the adaptive mirror arrangement.

In conventional light and sensor systems, e.g., the LARP system and the LiDAR system, are separately constructed and treated. The shared use or combination of both systems, e.g., in a vehicle, involves a high number of components and great costs due to individual part structures.

The arrangement according to various embodiments may provide the effect that the light system and the sensor system use a common adaptive mirror arrangement. It is therefore not necessary to provide a respective dedicated mirror arrangement for the light system and the sensor system. Installation space, weight and e.g. costs can be reduced due to said large-scale integration. When using the various embodiments for example in a vehicle or a vehicle headlamp, it is possible to realize economically high quantities without restricting the freedom in terms of vehicle design. Furthermore, synergies in terms of connection are attained.

The LiDAR system and the driving light each communicate with a control unit that recognizes road users. The integration makes possible more efficient communication with the superordinate controller and also a rudimentary evaluation of the data directly in the sensor module and/or light module in order to very quickly set the driving light to a changed environment. The high level of integration also permits fast data exchange and the shift of evaluation functions to the intelligent sensors/actuators. This reduces the data load on the bus systems and/or the vehicle-own body control unit (BCU). For customers, a single system is easier to operate, installation space requirements planning can be improved, and integration complexity is reduced. By combining the light system and the sensor system, aligned applications are possible which, individually, are not realizable or only with great time coordination.

In various embodiments used as the type of adaptive mirror arrangement is a digital light processing system (DLP system). In this projection technology, a light beam is decomposed into pixels by a rectangular arrangement of movable micromirrors and is then reflected pixel by pixel either into the projection path or out of the projection path. The core of this technology, the structural part that includes the rectangular arrangement (matrix) of mirrors and the drive mechanics thereof, is referred to as a DMD—digital micromirror device. The movement of the micromirrors is caused by the force effect of electrostatic fields. Each micromirror can be adjusted individually in terms of its angle and generally has two stable end states, between which it can switch with a high frequency. The latest DMD mirror systems can have up to 4096×2160 individual mirrors that can change their spatial position approximately 5000 times per second. The illumination of such a DLP system can be effected both using conventional light sources, e.g., halogen lamps or discharge lamps (high intensity discharge (HID)), and using light-emitting diodes (LEDs) or lasers (e.g., a LARP system).

The sensor system can be a light detection and ranging (LiDAR) system. The LiDAR distance measurement is based on a time-of-flight measurement of emitted electromagnetic pulses or radiation pulses. When they strike an object, a proportion of the pulse is reflected back by the surface of said object to a distance measurement unit and can be recorded as an echo pulse using a suitable sensor. If the emission of the pulse takes place at a time to and if the echo pulse is captured at a later time $t_1$, the distance d to the reflective surface of the object can be determined by the time of flight $\Delta t_A = t_1 - t_0$ in accordance with $d = \Delta t_A \, c/2$. Since the pulses are electromagnetic pulses, c is the value of the speed of light. The distance measurement unit not only has an emitter unit or radiation source and a receiver unit, but also one or more adjustable mirrors that can direct the radiation emitted by the radiation source into different solid angle segments. The oscillating micromirrors of the DLP system, preferably in cooperation with a downstream optical unit, permit scanning of a capturing field (field of view) in a horizontal angle region of, e.g., 60° or 120° and in a vertical angle region of, e.g., 30°. The receiver unit or the sensor can measure the incident radiation without spatial resolution. However, the receiver unit can also exhibit solid-angle resolution. The receiving unit or the sensor can be a photodiode, e.g., an avalanche photo diode (APD) or a single photon avalanche diode (SPAD), a PIN diode, or a photomultiplier. Objects at a distance of up to 60 m, up to 300 m or up to 600 m can be captured using the LiDAR system. A range of 300 m corresponds to a signal path of 600 m, from which for example a measurement duration of 2 µs can be obtained.

The radiation emitted by the radiation source can be, for example, infrared (IR) radiation emitted by a laser diode in a wavelength region of approximately 1050 nm. However, other wavelengths, e.g., 808 nm or 1600 nm, which are suitable for capturing the environment are also possible. Likewise conceivable is a combination of a plurality of wavelengths, for example in order to be able to recognize obstacles made of different materials or in different weather conditions. The plurality of wavelengths can here be emitted sequentially in terms of time or synchronously in terms of time, wherein each of the wavelengths is assigned a sensor function that is set for it.

The radiation from the light source and the radiation from the radiation source can be guidable to the mirror arrangement via a first optical element in a common beam path. The first optical element used in this case can be one or more mirrors, one or more dichroic mirrors, a waveguide, a lens, a reflector, a stop, a holographic element, a liquid-crystal display (LCD), a digital mirror device (DMD), a converter having a phosphor, and/or the like. Likewise conceivable is a combination of a plurality of optical elements.

The radiation from the radiation source and the radiation from the light source can be splittable or separable from the common beam path downstream of the adaptive mirror arrangement using a second optical element, which may have the same construction as the first optical element. In other words, the radiation from the radiation source or the radiation from the light source may be able to be coupled out of the common beam path downstream of the adaptive mirror arrangement and hereby be guided in each case in a dedicated beam path.

The first optical element and/or the second optical element is/are preferably in each case a dichroic mirror. Using a suitable dichroic mirror, which either reflects or transmits without obstruction light that is incident, depending on its wavelength, by way of a special coating, the light source for the light system and the radiation source for the sensor system for capturing the environment can be arranged at almost any desired location depending on the available space. Furthermore, it is possible using the second dichroic mirror to arrange downstream of the adaptive mirror arrangement a light function of the light system, e.g., low beam or high beam of a vehicle headlamp, independently of a sensor function of the sensor system, e.g., a parking space sensor or a parking aid.

The adaptive mirror arrangement can have a plurality of mirrors, wherein a respective mirror can be used to direct the radiation from the light source and/or from the radiation source into a respective emission region. The adaptive mirror arrangement can have a plurality of mirrors which are arranged in a plurality of lines or rows.

The mirrors of the adaptive mirror arrangement can be actuable in mirror groups. In other words, a mirror group can be formed by a plurality of mirrors. Like the individual mirrors, the mirror groups can also be arranged in one or more lines or rows.

The mirror groups can be arranged, for example, in the manner of a matrix and in the shape of a rectangle, e.g., in five lines and five columns, wherein each of the mirror groups can have a multiplicity of individual mirrors or micromirrors. The mirror groups can be actuable separately, i.e., they can be switchable in each case between an active position and a passive position. In the active position, the mirrors or mirror groups can direct incident radiation into the environment and, for example, light or scan a corresponding emission region. In the passive position, radiation that is incident on a mirror or on a mirror group can be absorbed for example in a beam dump. Actuating the mirrors or mirror groups in the case of a matrix-type arrangement can be effected, for example, line by line. Likewise conceivable, however, is actuation by columns.

The size or surface area of an emission region can be different, e.g. greater, than the surface area of a mirror or a mirror group. A respective emission region is assignable either to an individual mirror or to a mirror group which is formed from a plurality of mirrors.

The emission regions can differ from one another in terms of their size or surface area. If the mirror groups are arranged in the manner of a matrix and in the shape of a rectangle, e.g., in five lines and five columns, the width of the emission regions can for example have an identical size within each line, while increasing from line to line, e.g., in the vertical direction from the top to the bottom. It is also possible for the width of the emission regions to first decrease and then increase again, or vice versa, from line to line, e.g., in the vertical direction from the top to the bottom. It is also conceivable that the widths of the emission regions differ within a line. Due to the different embodiments of the emission regions of the mirrors or mirror groups, it is possible for example in the case of a sensor application for the spatial scanning region to be individually set and optimized.

An embodiment of an emission region or of a plurality of emission regions, e.g., the size or shape, is able to be set via at least one, for example distorting, optical unit. The emission regions can here have the same shape as the mirrors or mirror groups, e.g., the shape of a rectangle. It is possible using a for example distorting optical unit for individual mirrors or mirror groups to cover different angles in the environment. For example, narrow angles can finely resolve a large range, and wide angles can resolve a large region in closer vicinity of the vehicle. It is thus possible to optimize a spatial scanning region of the sensor system. Using an oblique focal plane, the effective resolution over the entire width of an emission region can be increased.

Both the radiation from the radiation source and the radiation from the light source can be emittable in the manner of pulses. The radiation of the exemplarily used laser diode can here be emitted at a frequency between 1 kHz and 1 MHz, e.g. at a frequency between 10 kHz and 100 kHz. Laser pulse duration can here be in the range from about 0.1 ns and about 100 ns (between 0.1 ns and 100 ns), e.g. in the range from about 1 ns to about 2 ns (e.g. between 1 ns and 2 ns).

The type of light source provided can be a light-emitting diode (LED) and/or a laser activated remote phosphor (LARP) system and/or an RGB laser. Alternatively, or in combination with the light sources mentioned, a halogen lamp, and/or a gas-discharge lamp (high intensity discharge (HID)), and/or in combination with a projector operating according to a digital light processing (DLP) principle can be provided. In this way, a multiplicity of alternatives for the light source are available.

In various embodiments, a LARP system is used as the light source for the light system. The excitation radiation can be produced by a laser diode. By way of the conversion element of the LARP system, the excitation radiation, e.g. blue laser light, can be partially converted into yellow conversion radiation. In the case of a partial conversion, a superposition of non-converted blue excitation light at a wavelength of approximately 450 nm and yellow conversion light then produces white used light at a wavelength of approximately 450 nm to 800 nm.

In a method according to various embodiments for an arrangement as per one or more of the preceding aspects, the mirror or the plurality of mirrors and/or the mirror groups of the adaptive mirror arrangement can be actuated such that the radiation from the light source and/or from the radiation source is directed into predetermined emission regions. In a next step, the back-reflected radiation of the radiation source is captured by the sensor system, e.g. in angle-resolved fashion. The radiation from the radiation source can here be reflected at an object, e.g., a road user or obstacle.

The mirrors or mirror groups can here be actuated in a predetermined sequence, wherein a predetermined time window is provided in the case of a respective actuation.

At least some of the mirrors or mirror groups, or all mirrors or all mirror groups, can be actuated sequentially, e.g., one after the other or in series. In a for example matrix-type arrangement of the mirrors or mirror groups, the sequential actuation of the mirrors or mirror groups, i.e., switching the mirrors or mirror groups into active positions such that the radiation from the light source and/or from the radiation source is directed into predetermined emission regions, can be effected line by line or column by column for example. During the e.g. sequential actuation of a mirror or of a mirror group, all remaining mirrors or mirror groups are in the passive position, and incident radiation in these regions is directed for example into a beam dump and absorbed.

The radiation source of the sensor system can emit one or more radiation pulses within a predetermined time window, e.g. during the actuation of a mirror or a mirror group. If the adaptive mirror arrangement is a DLP system and the radiation source is a laser diode emitting IR radiation, a plurality of laser pulses can be emitted by the laser diode during a time window because the pulse frequency of the laser diode is greater than the oscillation frequency of the mirrors of the DLP system by several orders of magnitude. In other words, the laser diodes can be modulated significantly more quickly than the DLP mirrors.

During capturing of a predetermined amount or a maximum value of the back-reflected radiation of the radiation source by way of the sensor system, which amount or value is able to be assigned to a specific mirror group by way of a e.g. sequential actuation of all mirror groups, the mirrors of said mirror group can form mirror subgroups which are again actuated, e.g. sequentially.

To capture a maximum value of the back-reflected radiation of the radiation source by way of the sensor system, all mirror groups can be actuated at the same time. By a e.g. sequential actuation of all mirror groups, the maximum value of the back-reflected radiation of the radiation source is assigned to a specific mirror group, wherein the mirrors of said mirror group can form mirror subgroups which can then again be sequentially actuated. The division of the mirror groups into mirror subgroups and the sequential actuation of the mirror subgroups for assigning the maximum value of the radiation captured by the sensor system can be repeated until the source of the back-reflected radiation captured by the sensor system is sufficiently accurately resolved. Before dividing the mirror groups into mirror subgroups, it is possible to check in an intermediate step whether the maximum value, captured by the sensor system, of the back-reflected radiation in the case of mirror groups which are actuated at the same time can be assigned to the mirror group to be divided.

In the method mentioned above, the light source of the light system can be switched off during the actuation of the mirrors or mirror groups of the adaptive mirror arrangement for capturing the environment by way of the sensor system, i.e., during a cycle. However, it is also possible for the light function of the light system and the sensor function of the sensor system to be effected via the adaptive mirror arrangement at the same time. In other words, both the light source of the light system and the radiation source of the sensor system can be switched on at the same time. If the arrangement according to various embodiments is used for example in a vehicle headlamp, specific emission regions of the vehicle headlamp which should never be dimmed for example during a low-beam function, e.g., centrally in front of the vehicle or at the roadside on the right, can be continuously irradiated, wherein the sensor function can also be used continuously in these regions. Due to the different wavelengths of the radiation from the light source for the light system and of the radiation from the radiation source for the sensor system, no crosstalk occurs, i.e., no undesired mutual influence, between the two types of radiation. A vehicle can have a plurality of arrangements according to various embodiments having one or more light sources for one or more light systems, for example, each of the at least two front headlamps and/or one or more or all of the further functional vehicle illumination or light devices (fog light, indicator light, brake light, reverse light, etc.) can be equipped with one or more of the arrangements according to the invention. Each of the headlamps and/or the further vehicle illumination or light devices can use the same or different LiDAR infrared wavelengths.

A radiation duration of the light source and/or a radiation duration of the radiation source can be set dynamically. That is to say that cycles during which for example the light source is switched off and the radiation source of the sensor system capturing the environment is switched on can have different lengths. If the sensor system captures no objects or obstacles for example during a time window within a cycle, i.e., if the back-reflected radiation captured by the sensor system does not exceed a prescribed maximum value, the light source can be switched on again before an actual end of the cycle. When switching on the light source, the amplitude or radiant power of the radiation from the light source can here be lower compared to the previous cycle in order to attain a constant brightness impression during different cycle times.

According to various embodiments, a vehicle having an arrangement in accordance with one or more of the preceding aspects is provided.

The vehicle can be an aircraft or a watercraft or a land vehicle. The land vehicle can be a motor vehicle or a rail vehicle or a bicycle. In various embodiments, the use of the vehicle headlamp in a truck or passenger car or motorcycle may be provided.

The light source of the light system as a light-emitting means can be used, for example, for a fog light function, daytime running light function, low-beam function, high-beam function, reverse light function, signal light function, position light function, indicator light function, brake light function, accent illumination function, effect light-emitting means, and for further, non-automotive applications, e.g. as light-emitting means in projectors for effect light illumination, entertainment illumination, architainment illumination, outdoor illumination, offshore illumination, illumination for wind turbines, ambient illumination, medical and therapeutic illumination, or illumination for horticulture or animal husbandry.

The light source of the light system does not have to be white used light which is used in a vehicle in a front headlamp. For 360° capturing around a vehicle, the invention can also be used in a tail light. The radiation of the sensor system need only differ in terms of wavelength and/or polarization and/or pulse width modulation (PWM) from the radiation from the light system used for the light function in order to be able to split or separate it in the beam path.

Various embodiments can also be used in stationary fashion outside vehicles. For example, it is possible to use various embodiments in video or data projectors for example in order to control, in the case of a presentation, the progression of said presentation by way of gestures performed by a presenter or, in the case of videogames, to recognize the movement of players without a controller.

FIG. 1 shows e.g. a simplified optical method of function of a LARP system, of a LiDAR system, and of a DLP system 10.

A light source LQ in the form of a LARP system includes a laser diode 1 and a conversion element 4. The laser diode 1 emits blue laser light 2 at a wavelength of approximately 450 nm. The blue laser light 2 falls as excitation radiation onto the conversion element 4, which includes a phosphor or is made therefrom. The blue laser light 2 is at least partially absorbed by the phosphor and at least partially converted into yellow conversion radiation. In the case of partial conversion, the superposition of non-converted blue laser light 2 and yellow conversion light produces white used light 6 at a wavelength range of approximately 450 nm to 800 nm. The white used light 6 passes through a dichroic mirror 8 and is incident on a DLP system 10 as an adaptive mirror arrangement. After the DLP system 10, the white used light 6 passes through a second dichroic mirror 8 and is used as a light-emitting means in a vehicle headlamp. Not illustrated is the light path that directs white used light 6 into a beam trap for absorption purposes. The light source LQ in the vehicle headlamp can thus light different regions or angle regions at different brightnesses depending on the radiation intensity and depending on the actuation of the DLP system 10.

The LiDAR system as the sensor system for capturing the environment has a radiation source SQ in the form of a laser diode that emits infrared radiation 12 at a wavelength of approximately 1050 nm. The infrared radiation 12 is coupled into the path of the white used light 6 via a lower deflection mirror 14 and the dichroic mirror 8 and directed onto the DLP system 10. After the DLP system 10, the infrared radiation 12 is coupled out of the path of the white used light 6, or is separated from the white used light 6, via the dichroic mirror 8, is directed via a further lower deflection mirror 14, and cast into the distance for capturing the environment.

Figure 2:
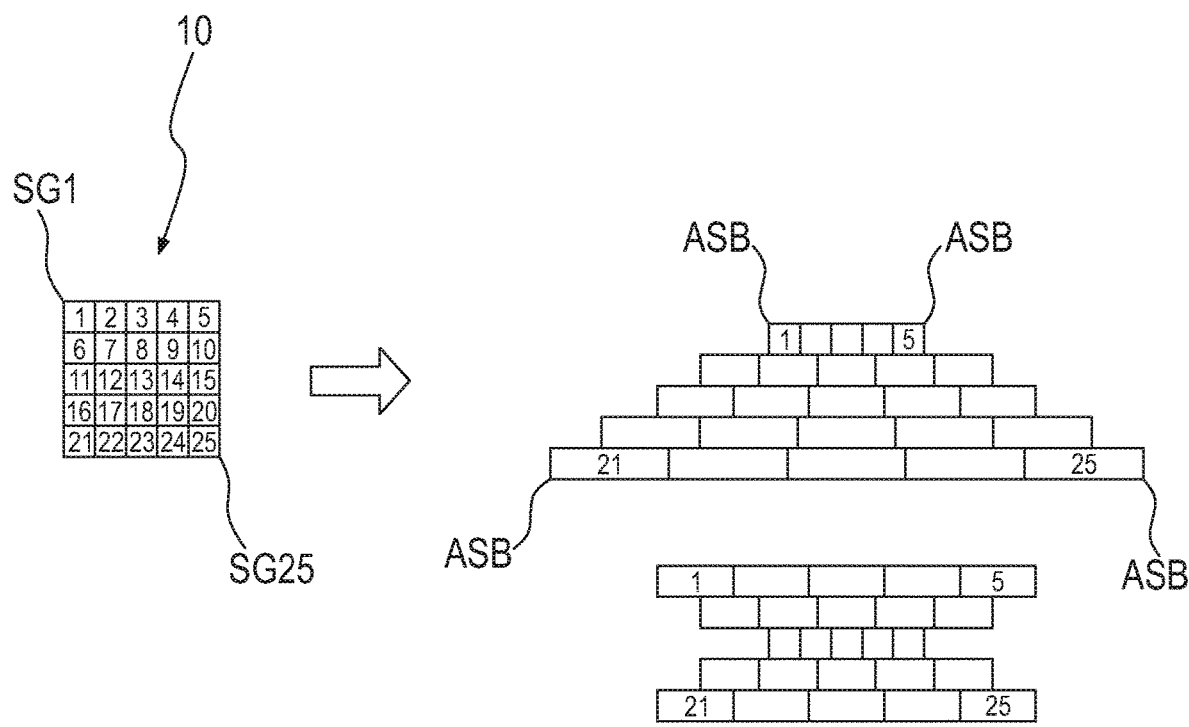
FIG. 2 shows a schematic view of a DLP system and different refinements of emission regions.
Figure 2:
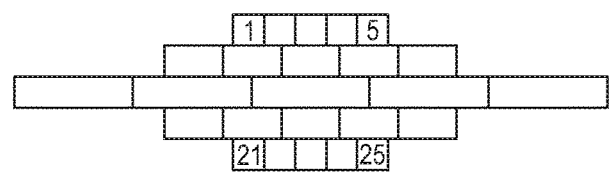
Figure 2:
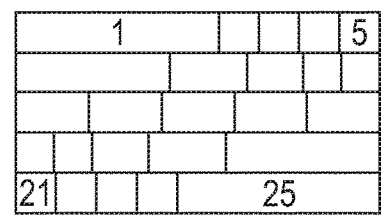

FIG. 2 on the left schematically shows a mirror group arrangement of the DLP system 10. The mirrors of the DLP system 10 in the embodiment are divided into 25 mirror groups SG (also SG1 to SG25 below). Although this is not shown in more detail, each of the mirror groups SG1 to SG25 illustrated on the left-hand side in FIG. 2 has a multiplicity of individual mirrors. The mirror groups SG1 to SG25 having in each case a plurality of mirrors are arranged in the manner of a matrix and have the shape of a rectangle, in five lines and five columns. On the right-hand side in FIG. 2, four possible examples of different refinements of the emission regions ASB of the mirror groups SG1 to SG25 of the DLP system 10 are shown. The different refinements of the emission regions ASB, e.g., the size or shape thereof, are settable via a distorting optical unit (not shown) that is arranged downstream of the DLP system 10.

In the first example on the right-hand side of FIG. 2, the widths of the emission regions ASB within each line have the same size (cf. the widths of the emission regions ASB 1 to 5), but increase from line to line in the vertical direction from the top to the bottom (cf. the widths of the emission regions ASB 21 to 25). In the second example on the right-hand side of FIG. 2, the widths of the emission regions ASB initially decrease from line to line in the vertical direction from the top to the bottom and then increase again. In the third example on the right-hand side of FIG. 2, the widths of the emission regions ASB initially increase from line to line in the vertical direction from the top to the bottom and then decrease again. In the fourth example on the right-hand side in FIG. 2, the widths of the emission regions ASB in each case differ within one line. Due to the different embodiments of the emission regions ASB of the mirrors or mirror groups, it is possible for example in the case of a sensor application for the spatial scanning region to be individually set and optimized.

Figure 3:
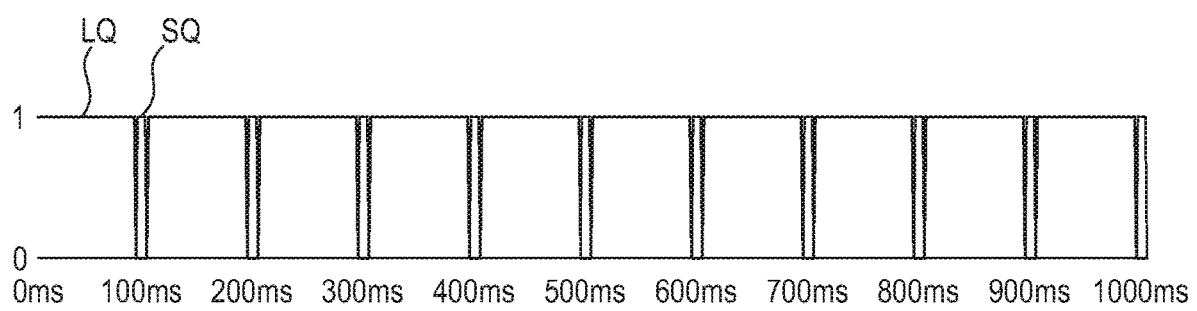
FIG. 3 shows an illustration of an actuation method of a light source and a radiation source of an arrangement in accordance with FIG. 1.

FIG. 3 schematically shows an actuation method of the light source LQ and of the radiation source SQ of an arrangement in accordance with FIG. 1. In the actuation method shown in FIG. 3, the light source LQ and the radiation source SQ are switched on and off in alternation. The on-time of the light source LQ is approximately ten times as long as the on-time of the radiation source SQ. During the time in which the light source LQ is switched off, the DLP system 10 is actuated in accordance with one of the methods described below and irradiated by the radiation source SQ.

Figure 4:
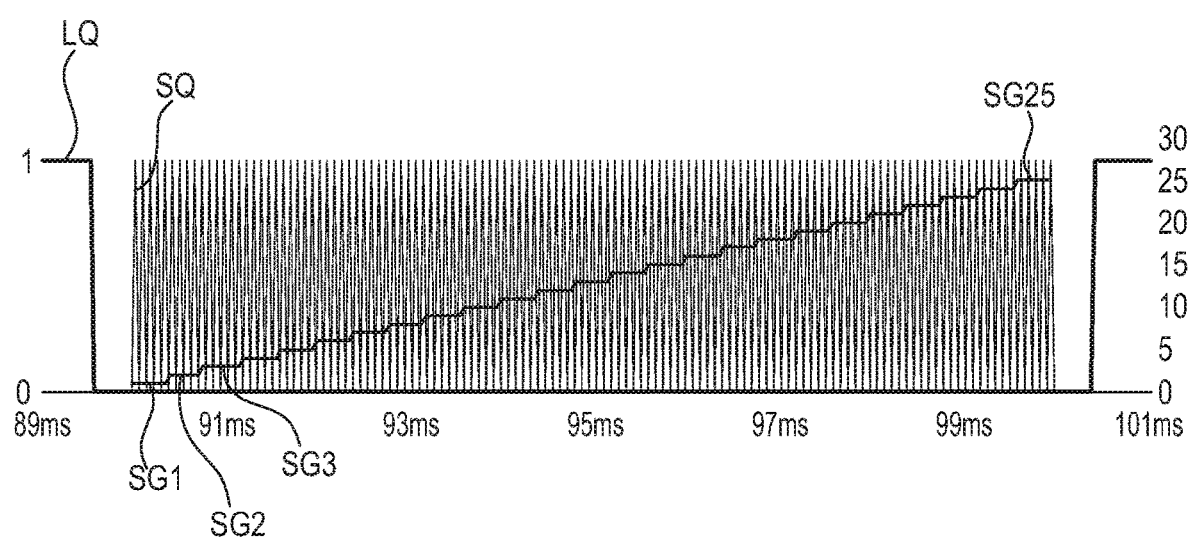
FIG. 4 shows an illustration of an actuation method of a DLP system.

FIG. 4 schematically shows an actuation method of the DLP system 10 during one cycle, i.e., in the phase in which the light source LQ is switched off.

The mirror groups SG1 to SG25 are sequentially actuated during the off-time of the light source LQ, i.e., from mirror group SG1 to mirror group SG25. During the sequential actuation of a mirror group SG, all remaining mirror groups SG are in the passive position, and incident radiation in these regions is directed into a beam dump (not illustrated) and absorbed.

The radiation source SQ of the sensor system emits one or more radiation pulses during a predetermined time window. During a time window, a plurality of laser pulses can be emitted by the laser diode of the LiDAR system because the pulse frequency of the laser diode is greater than the oscillation frequency of the mirrors of the mirror groups SG of the DLP system 10 by several orders of magnitude. In other words, the laser diodes can be modulated significantly more quickly than the DLP mirrors.

Figure 5:
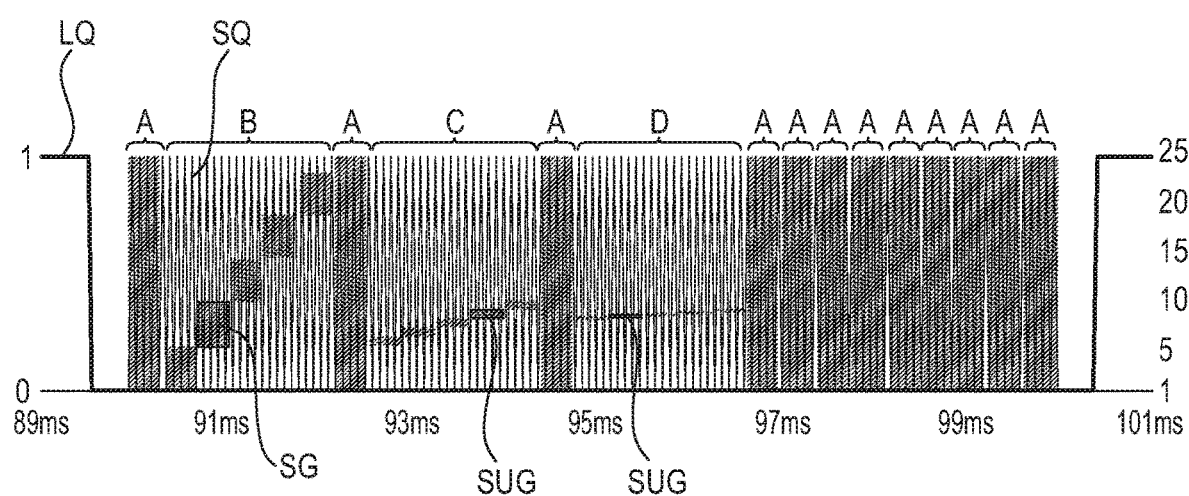
FIG. 5 shows an illustration of a further actuation method of a DLP system.

FIG. 5 schematically shows a further actuation method of the DLP system 10 during the phase in which the light source LQ is switched off.

For capturing a maximum value of the back-reflected radiation of the radiation source SQ by way of the sensor system, in a first step A, all mirror groups SG of the DLP system are actuated at the same time (step A). The mirrors of the DLP system are then divided into five mirror groups SG, wherein in step B the maximum value of the back-reflected radiation of the radiation source SQ is assigned to a specific mirror group SG by way of sequential actuation of the five mirror groups SG. In an intermediate step (step A), which follows step B, a check is performed once again by simultaneous actuation of all mirror groups SG as to whether the maximum value, captured by the sensor system, of the back-reflected radiation corresponds to the maximum value of the back-reflected radiation of the mirror group SG ascertained in step B. The mirrors of the mirror group SG ascertained in step B form mirror subgroups SUG, which are then actuated again sequentially (step C). The division of the mirror groups SG into mirror subgroups SUG, or the division of mirror subgroups SUG into further mirror subgroups SUG, and the sequential actuation of the mirror subgroups SUG for assigning the maximum value of the radiation captured by the sensor system is repeated until the source of the back-reflected radiation captured by the sensor system is sufficiently accurately resolved (step D).

Disclosed is an arrangement for a vehicle, having a light source for a light system and a radiation source for a sensor system for capturing the environment. The light source is connected downstream of an adaptive mirror arrangement, via which the emittable light is directable. The radiation from the radiation source for the sensor system is directable via the adaptive mirror arrangement.

| List of Reference Signs | |
| --- | --- |
| Step | A, B, C, D |
| Emission region | ASB |
| Light source | LQ |
| Radiation source | SQ |
| Mirror group | SG |
| Mirror subgroup | SUG |
| Laser diode | 1 |
| Blue laser light | 2 |
| Conversion element | 4 |
| White used light | 6 |
| Dichroic mirror | 8 |
| DLP system | 10 |
| Infrared radiation | 12 |
| Lower deflection mirror | 14 |

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An arrangement, comprising:
   a light source for a light system;
   an adaptive mirror arrangement connected downstream of the light source via which adaptive mirror arrangement light that is emittable by the light source is directable; and
   a radiation source for a sensor system for capturing an environment;
   wherein the radiation from the radiation source for the sensor system is directable via the adaptive mirror arrangement.

2. The arrangement of claim 1,
   wherein provided as a type of the adaptive mirror arrangement is a digital light processing system.

3. The arrangement of claim 1,
   wherein the sensor system is a light detection and ranging system.

4. The arrangement of claim 1,
   wherein provided as a type of the radiation source is a radiation source emitting infrared radiation.

5. The arrangement of claim 1,
   at least one of wherein the radiation from the light source and the radiation from the radiation source is guidable into a common beam path to the mirror arrangement via a first optical element; or wherein the radiation from the radiation source and the radiation from the light source after the adaptive mirror arrangement is separable out of the common beam path via a second optical element.

6. The arrangement of claim 1,
wherein the adaptive mirror arrangement includes a plurality of mirrors;
wherein the radiation at least one of from the light source or from the radiation source is directable into a respective emission region with a respective mirror.

7. The arrangement of claim 6,
wherein the mirrors are actuable in mirror groups.

8. The arrangement of claim 7,
wherein the mirror groups are arranged in one or more lines.

9. The arrangement of claim 8,
wherein a refinement of an emission region or of a plurality of emission regions can be set via at least one optical unit.

10. The arrangement of claim 1,
wherein the adaptive mirror arrangement includes a plurality of mirrors which are arranged in one or more lines.

11. The arrangement of claim 10,
wherein the mirrors are actuable in mirror groups.

12. The arrangement of claim 11,
wherein the mirror groups are arranged in one or more lines.

13. The arrangement of claim 12,
wherein a refinement of an emission region or of a plurality of emission regions can be set via at least one optical unit.

14. The arrangement of claim 1,
wherein the radiation at least one of from the radiation source or from the light source is/are emittable in pulses.

15. A method for an arrangement,
the arrangement comprising:
   a light source for a light system;
   an adaptive mirror arrangement connected downstream of the light source via which adaptive mirror arrangement light that is emittable by the light source is directable; and
   a radiation source for a sensor system for capturing an environment;
   wherein the radiation from the radiation source for the sensor system is directable via the adaptive mirror arrangement;
the method comprising:
   actuating at least one mirror or a plurality of mirrors or mirror groups of the adaptive mirror arrangement such that the radiation at least one of from the light source or from the radiation source is directed into predetermined emission regions; and
   capturing the back-reflected radiation of the radiation source via the sensor system.

16. The method of claim 15,
wherein the mirrors or mirror groups are actuated in a predetermined sequence,
wherein a predetermined time window is provided in the case of a respective actuation.

17. The method of claim 15,
wherein at least some of the mirrors or mirror groups or all mirrors or mirror groups are actuated sequentially.

18. The method of claim 15,
wherein, in the case of capturing of a predetermined level of the back-reflected radiation of the radiation source via the sensor system that is assignable to a specific mirror group, the mirrors of that mirror group form mirror subgroups which are actuated again.

19. The method of claim 15,
wherein at least one of a radiation duration of the light source or a radiation duration of the radiation source is/are set dynamically.

20. A vehicle, comprising:
an arrangement, comprising:
   a light source for a light system;
   an adaptive mirror arrangement connected downstream of the light source via which adaptive mirror arrangement light that is emittable by the light source is directable; and
   a radiation source for a sensor system for capturing an environment;
   wherein the radiation from the radiation source for the sensor system is directable via the adaptive mirror arrangement.

* * * * *